Aug. 29, 1967 U. S. LINDHOLM ET AL 3,338,092
DYNAMIC BIAXIAL TESTING MACHINE
Filed July 16, 1965
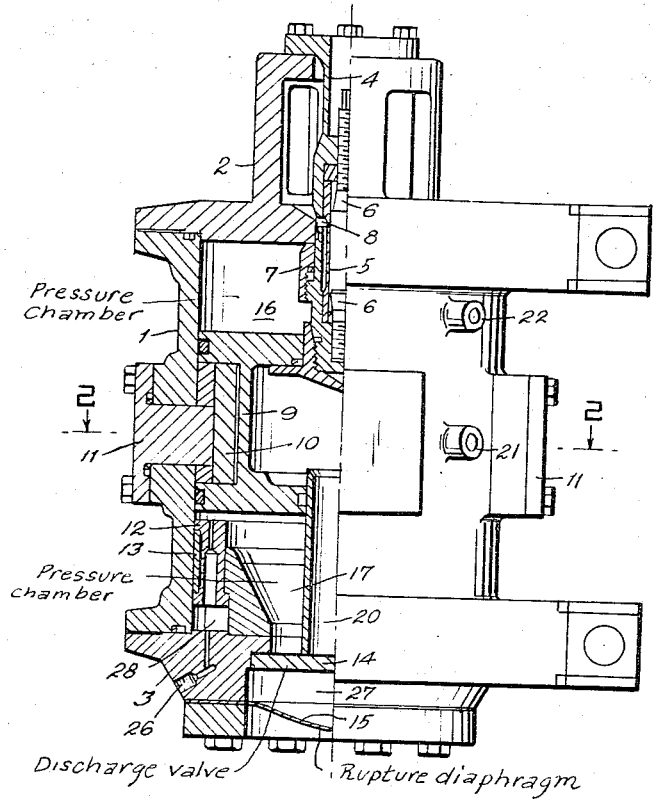
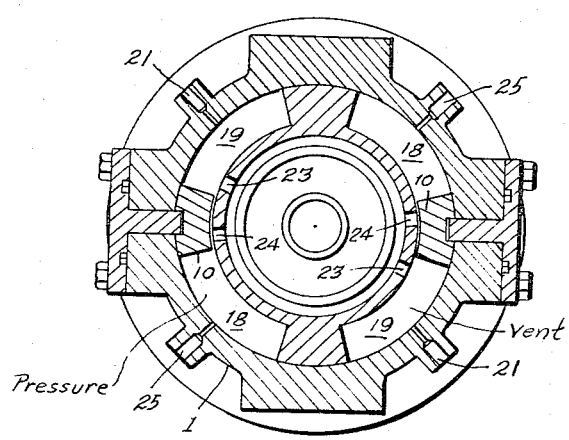
INVENTORS,
U. S. Lindholm
L. R. Garza
Ethelbert J. Baker, Jr.
BY: Harry M. Saragovitz,
Edward J. Kelly &
A. J. Dupont
ATTORNEYS

United States Patent Office 3,338,092
Patented Aug. 29, 1967

3,338,092
DYNAMIC BIAXIAL TESTING MACHINE
Ulric S. Lindholm, Luis R. Garza, and Ethelbert J. Baker, Jr., San Antonio, Tex., assignors, by mesne assignments, to the United States of America as represented by the Secretary of the Army
Filed July 16, 1965, Ser. No. 472,745
4 Claims. (Cl. 73—99)

ABSTRACT OF THE DISCLOSURE

This apparatus supplies, to a specimen to be tested, a twisting torque plus a longitudinal pull. The specimen 5 is quickly attached to the stationary housing and to piston 9 by collets 6. Piston 9 is driven longitudinally by fluid in pressure chamber 16 and is given a rotary twist by fluid in pressure chambers 18. The degree of pressure required to rupture the specimen can be readily checked.

---

This invention relates to a dynamic biaxial testing machine which has the capability of applying combined axial and torsional loads to thin walled tubular specimens in time durations on the order of milliseconds. The magnitudes of the axial and torsional loads may be independently controlled so that various ratios of combined stress may be achieved between the limits of pure tension and pure torsion. The machine may also be operated statically. The apparatus consists of a pneumatically driven piston which loads a cylindrical tubular specimen in combined tension and torsion.

In the accompanying drawing:

FIG. 1 is a partial cross section through the testing apparatus and

FIG. 2 is a cross section along line 2—2 of FIG. 1.

A pressure chamber consists of cylinder 1, upper cap 2, which also carries the specimen support structure, and lower cap 3 which contains the pressure release system. Specimen 5 is attached to the upper cap through force transducer section 4. The lower end of the specimen is attached to the drive piston 9 to which axial thrust and torsion loading is applied. Specimen grips 6 consist of expandable collets which hold the specimen against the inner wall of the dynamometer and piston assembly. A close tolerance is maintained between the O.D. of the specimen in the grip area and the I.D. of the specimen holders to prevent preloading of the specimen by the grips.

The loading is pneumatic, using a compressed gas as the working fluid. Piston 9 is driven by two separate pressure systems; the thrust system controlled by chambers 16 and 17, and the torsion system controlled by chambers 18 and 19 (FIG. 2). The piston is free to move independently in axial and torsional displacement.

To describe the operation, the axial or tensile loading system will be considered first. In order to obtain maximum loading rates, a rapid pressure release through large orifices in the lower cap 3 is used rather than a metered valve control. Initially, both the thrust drive chamber 16 and the thrust vent chamber 17 are pressurized equally by fluid introduced through passages 22 and 26. The vent chamber is sealed by the discharge valve 14 which is simply a circular plate with a rubberized upper surface to maintain a seal across both thrust vent chamber 17 and torsion chamber exhaust 20. This seal is held in place solely by pressure in the small chamber 27 sealed by the rupture diaphragm 15. The axial load is applied when the rupture diaphragm is burst by a small increase in pressure in chamber 27. The internal pressure in the vent chamber 17 then blows out the discharge valve 14 dropping the pressure rapidly on the bottom of the piston and thus applying a tensile load to the specimen equal to the set pressure times the piston area. The initial position of the piston is controlled by the stroke adjustment 7 which fixes the length of the positive stroke. The piston, after moving this preset distance, picks up the deceleration piston 12. Simultaneously, the pressure in the drive chamber is released through the thrust pressure exhaust 8 reducing the driving force. As the deceleration piston moves downward, it compresses a volume of trapped gas in chamber 28 thus building up a resisting spring-like force. This compressed gas also forces a brake shoe 13 against the cylinder wall providing an additional dissipative braking force which helps prevent rebound of the piston. Deceleration is thus accomplished by both release of the driving pressure and the action of deceleration piston 12 and brake shoe 13. The stroke adjustment is used to limit the distance of free travel.

The operation in torsion is similar. Looking at FIG. 2, there are four torsion chambers; two drive 18 and two vent 19. These four chambers are all initially pressurized equally and independently of the thrust chambers through ports 21 and 25. When the rupture diaphragm is burst and the discharge valve opens, the torsion vent chambers 19 exhaust through the center of the piston and the exhaust stand pipe 20. The piston is thus driven counterclockwise by the pressure in chambers 18. The sliding seals 10 are fixed from rotational motion by the guides 11 but are free to move axially so as to accommodate the simultaneous axial motion of the piston. The piston is thus allowed to translate and rotate at the same time. The torsional motion of the piston is controlled by the two pairs of slotted openings between the drive and vent chambers and the exhaust path. As the piston moves counterclockwise, the openings 23, through which the vent chambers are being exhausted, are closed by the seals 10, trapping the remaining gas. Simultaneously, the drive chambers are opened to the exhaust through openings 24 and the drive pressure is dumped. Pressurized fluid trapped in the vent chambers acts as a decelerating spring until the rotary motion of the piston is reversed and comes to rest. If it is entirely free of pressurized fluid it may oscillate a few times before coming to rest.

The above description outlines the major features of the dynamic operation. Each of the chambers could be pressurized independently, permitting continuous control of torsional and tensile loading between the limits of pure tension and pure torsion. The rate of loading can be controlled by the initial set pressure and by variable orifice plugs which fit in the exhaust outlets, just above the discharge valve. For low strain rate or quasi-static operation, all the vent chambers are left open and the load is applied by valve controlled flow of gas to the drive chambers.

The force transducer 4, connected in series with the specimen, is instrumented with four strain gage rosettes to monitor independently the axial, torsional and bending stresses transmitted by the specimen. The bending may be measured about two axes and is used to check on the alignment of the specimen. Deformation in the specimen may be recorded by placing strain gages directly on each specimen.

We claim:
1. Dynamic biaxial testing apparatus comprising a cylinder, means closing each end of said cylinder, a piston in said cylinder, said piston being substantially free to reciprocate and substantially free to rotate, means connecting a specimen to be tested to a means for closing an end of said cylinder, means connecting the specimen to said piston, means to admit pressurized fluid to opposite faces of said piston, means to abruptly discharge the pressurized fluid from one face of said piston whereby unbal- anced pressurized fluid-force on the opposite face moves said piston rapidly toward said one face, and torque means to apply a turning force to said piston to thereby apply a torque tending to rupture said specimen, said torque means comprising a radial outward projection on said piston, a cooperating inward radial projection in said cylinder, said projections and cylinder and piston forming a chamber, means to supply and exhaust fluid from said chamber thereby applying a force to said projection to apply a torque to said specimen.

2. Apparatus as in claim 1 wherein said means to abruptly discharge the pressurized fluid comprises a blow-out valve held in place by pressurized fluid contained between said valve and a rupturable diaphragm, said diaphragm being designed to rupture at a desired pressure to thereby relieve the pressurized fluid to permit the valve to blow out and relieve the pressure on one end of the piston and permit the pressure on the opposite end of the piston to exert a force on said specimen.

3. Apparatus as in claim 1 and a deceleration piston to slow said first-mentioned piston as it is moved rapidly toward said one face.

4. Apparatus as in claim 3 and a brake shoe to aid said deceleration piston in slowing said first-mentioned piston.

References Cited

UNITED STATES PATENTS

| | | | |
|---|---|---|---|
| 2,576,433 | 11/1951 | Wood | 73—90 |
| 2,966,793 | 1/1961 | Mullaney et al. | 73—12 X |
| 3,109,305 | 11/1963 | Kilmer et al. | 73—12 X |
| 3,122,915 | 3/1964 | Haller | 73—99 |
| 3,209,580 | 10/1965 | Colby | 73—12 |
| 3,226,974 | 1/1966 | Bresk | 73—12 |

FOREIGN PATENTS

| | | |
|---|---|---|
| 96,334 | 2/1898 | Germany. |
| 879,478 | 10/1961 | Great Britain. |

JAMES J. GILL, *Acting Primary Examiner.*

RICHARD C. QUEISSER, *Examiner.*

J. H. WILLIAMSON, *Assistant Examiner.*